United States Patent
Tischler et al.

(10) Patent No.: US 7,143,225 B1
(45) Date of Patent: Nov. 28, 2006

(54) APPARATUS AND METHOD FOR VIEWING DATA PROCESSOR BUS TRANSACTIONS ON ADDRESS PINS DURING MEMORY IDLE CYCLES

(75) Inventors: Brett A. Tischler, Longmont, CO (US); Redentor D. Valencia, Longmont, CO (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 280 days.

(21) Appl. No.: 10/426,010

(22) Filed: Apr. 29, 2003

(51) Int. Cl.
*G06F 13/14* (2006.01)
*G06F 12/00* (2006.01)

(52) U.S. Cl. .......................... 710/305; 711/1
(58) Field of Classification Search ............... 710/305; 711/1
See application file for complete search history.

(56) References Cited

U.S. PATENT DOCUMENTS

| | | | |
|---|---|---|---|
| 3,736,567 A * | 5/1973 | Lotan et al. ............. 712/231 |
| 4,280,186 A * | 7/1981 | Hidai et al. ............. 345/441 |
| 5,278,801 A * | 1/1994 | Dresser et al. ........ 365/230.02 |
| 5,748,921 A * | 5/1998 | Lambrecht et al. ........ 710/309 |
| 5,838,692 A | 11/1998 | Tobin |
| 6,044,412 A * | 3/2000 | Evoy ............................. 710/14 |
| 6,185,662 B1 * | 2/2001 | Beyerlein et al. ........... 711/147 |
| 6,385,748 B1 * | 5/2002 | Chen et al. ................. 714/724 |
| 6,718,440 B1 * | 4/2004 | Maiyuran et al. .......... 711/137 |

\* cited by examiner

*Primary Examiner*—Rehana Perveen
*Assistant Examiner*—Jeremy S. Cerullo

(57) ABSTRACT

A processing system comprising: i) a processor core; ii) a memory; iii) a plurality of peripheral devices; and iv) a communication bus coupled to the processor core, the memory and the peripheral devices for transferring bus transactions between the processor core, the memory, and the peripheral devices. The communication bus comprises a bus controller for receiving memory access request data associated with a first memory access to a first location in the memory by a first one of the peripheral devices and transferring the received memory access request data to at least one memory address pin used to access the memory.

18 Claims, 3 Drawing Sheets

APPARATUS AND METHOD FOR VIEWING DATA PROCESSOR BUS TRANSACTIONS ON ADDRESS PINS DURING MEMORY IDLE CYCLES

TECHNICAL FIELD OF THE INVENTION

The present invention is generally directed to data processors and, in particular, to a data processor that captures transactions on an internal bus and reflects the transactions onto the address pins to external memory.

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

SOC data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

However, many SOC designs are increasingly encountering new problem related to the lack of visibility of key interface points in the SOC design. Interface points that were previously externally visible (i.e., accessible) between separate IC chips in earlier designs are now internal points on a single IC chip. This is particularly true of processor buses that interconnect the processor core, memory and peripheral components. Previously, logic analyzers could be coupled directly to the address, data and control lines of processor buses in order to perform debugging and testing procedures.

In new designs, however, these buses are internal to the SOC device. This makes testing and debugging operations more complex. In order to test the operation of an internal bus, the logic analyzer also must be integrated onto the IC chip and the test data must be brought out onto external pins. Unfortunately, this increases the pin-count of the SOC device, an undesirable result.

Therefore, there is a need in the art for improved system-on-a-chip (SOC) devices and other large-scale integrated circuits. In particular, there is a need for improved apparatuses and methods for monitoring transactions on an internal bus in a system-on-a-chip (SOC) device. More particularly, there is a need for improved apparatuses and methods for monitoring transactions on an internal bus in an SOC device without increasing the pin count of the SOC device.

SUMMARY OF THE INVENTION

To address the above-discussed deficiencies of the prior art, it is a primary object of the present invention to provide a processing system comprising: i) a processor core; ii) a memory; iii) a plurality of peripheral devices; and iv) a communication bus coupled to the processor core, the memory and the plurality of peripheral devices and capable of transferring bus transactions between the processor core, the memory, and the plurality of peripheral devices. According to an advantageous embodiment of the present invention, the communication bus comprises a bus controller capable of receiving memory access request data associated with a first memory access to a first location in the memory by a first one of the peripheral devices and transferring the received memory access request data to at least one memory address pin used to access the memory.

According to one embodiment of the present invention, the bus controller transfers the received memory access request data to the at least one memory address pin via a memory controller associated with the processing system.

According to another embodiment of the present invention, the bus controller transfers the received memory access request data to the at least one memory address pin during at least one no-operation (NOP) cycle on the at least one memory address pin.

According to still another embodiment of the present invention, the received memory access request data comprises status flag bits associated with the first bus transaction.

According to yet another embodiment of the present invention, the received memory access request data comprises identification data associated with the first peripheral device.

According to a further embodiment of the present invention, the status flag bits comprise an Instruction Fetch flag.

According to a still further embodiment of the present invention, the status flag bits comprise a Data Fetch flag.

According to a yet further embodiment of the present invention, the status flag bits comprise a Translation Lookaside Buffer (TLB) Walk flag.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system-on-a-chip (SOC) device.

Figure 1:
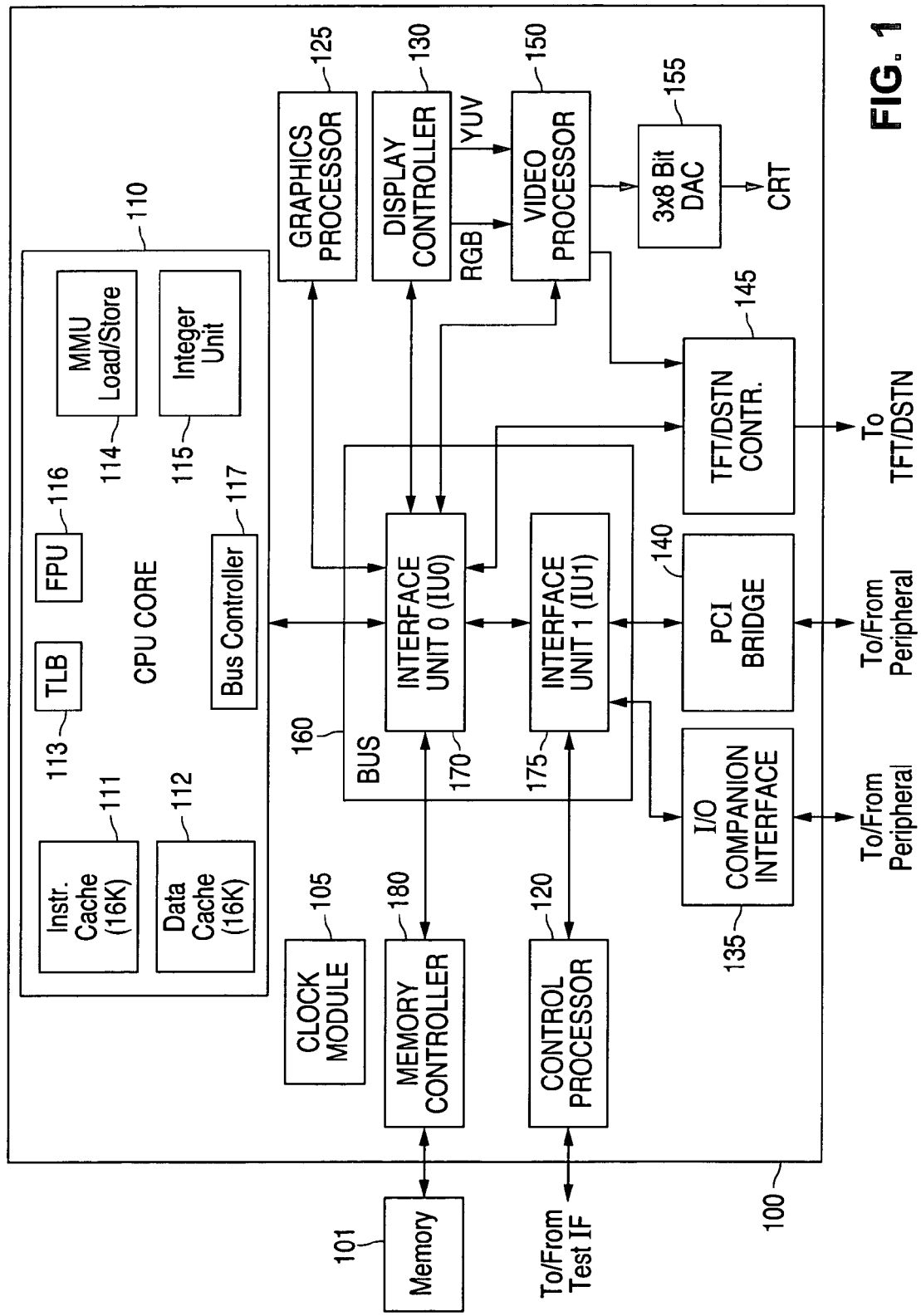
FIG. 1 illustrates an exemplary processing system according to one embodiment of the present invention.

FIG. 1 illustrates exemplary processing system 100 according to one embodiment of the present invention. In the exemplary embodiment, processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Processing system 100 comprises clock module 105, central processing unit (CPU) core 110, control processor 120, graphics processor 125, display controller 130, input/output (I/O) companion interface (IF) 135, peripheral component interconnect (PCI) bridge 140, TFT/DSTN controller 145, video processor 150, 3×8 bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) 115, floating point unit (FPU) 116, and bus controller 117. According to an exemplary embodiment of the present invention, instruction cache 111 is 16 kilobytes and data cache 112 is 16 kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) GX1 processor.

Integer unit 115 comprises an instruction pipeline and associated logic. According to an exemplary embodiment, IU 115 consists of a single-issue eight-stage pipeline. The eight stages of the instruction pipeline in IU 115 are:

1) Instruction Pre-fetch stage;
2) Instruction Pre-decode stage;
3) Instruction Decode stage;
4) Instruction Queue stage;
5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data operand address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory (μFROM) is read for setup to Execution Unit stage.

In the Execution Unit stage, register and/or data memory fetches are fed through the Arithmetic Logic Unit (ALU) for arithmetic or logical operations. The μFROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies IU 115 pipeline with instructions, data, and translated addresses. To support efficient delivery of instructions, the memory subsystem uses instruction cache 111 and TLB 113. According to an exemplary embodiment of the present invention instruction cache 111 may be a single clock access, 16 KB, 4-way set associative cache and TLB 113 may be an 8-entry, fully associative, translation look-aside buffer for data and an 8-entry, fully associative, translation look-aside buffer for instructions. TLB 113 performs necessary address translations when in protected mode.

TLB 113 may also comprise a second-level (L2) unified (instruction and data), 64-entry, 2-way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit 115 by enabling simultaneous access to both instruction cache 111 and data cache 112.

Floating-point unit (FPU) 116 is a pipelined arithmetic unit that performs floating-point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. In-circuit emulation (ICE) capabilities are supported through the JTAG and TAP Controller interface.

As noted above, internal bus 160 comprises two interface units: IU0 170 and IU1 175. IU0 170 connects six high-speed modules together with a seventh link to IU1 175. IU1 175 connects to three low-speed modules, namely I/O companion IF 135, PCI bridge 140, and TFT/DSTN controller 145.

Memory controller 180 is the source for all access to memory 101 in processing system 100. Memory controller 180 supports a memory data bus width of sixty-four (64) bits. Memory controller 180 supports two types of memory 101. The first type of memory 101 is a 111 MHz 222 MT/S for DDR (Dual Data Rate). The second type of memory 101 is a 133 MHz for SDR (Single Data Rate). Memory controller 180 supports up to one gigabyte (1 GB) of either SDR memory 101 or DDR memory 101.

The modules that need access to memory 101 are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes 8-bit pixels and sync signals to the GUI, which expands the pixels to 24 BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

For the purposes of debugging and testing the operation of processing system 100, it is often necessary to monitor bus transactions on internal bus 160. In particular, it is important to be able to monitor transactions between a first (or master) bus device coupled to internal bus 160 and a second (or slave) bus device coupled to internal bus 160. For example, a debug procedure may need to capture bus transactions at full operating speed between PCI bridge 140 and CPU core 110.

The present invention provides a novel apparatus and a related method that, during debug (or test) mode, enable internal bus 160 to capture information related to bus transactions between a first selected (master) bus device and a second selected (slave) bus device. The bus transaction is executed between the master and slave bus devices by internal bus 160 in the conventional manner. However, data associated with the captured bus transaction information are mirrored out on the address pins to memory 101 during the no operation (NOP) cycles after the read (or write) memory control signal(s) have been exerted, when the address pins are normally in an no operation (NOP) state. This occurs in parallel with the bus transaction itself.

Figure 2:
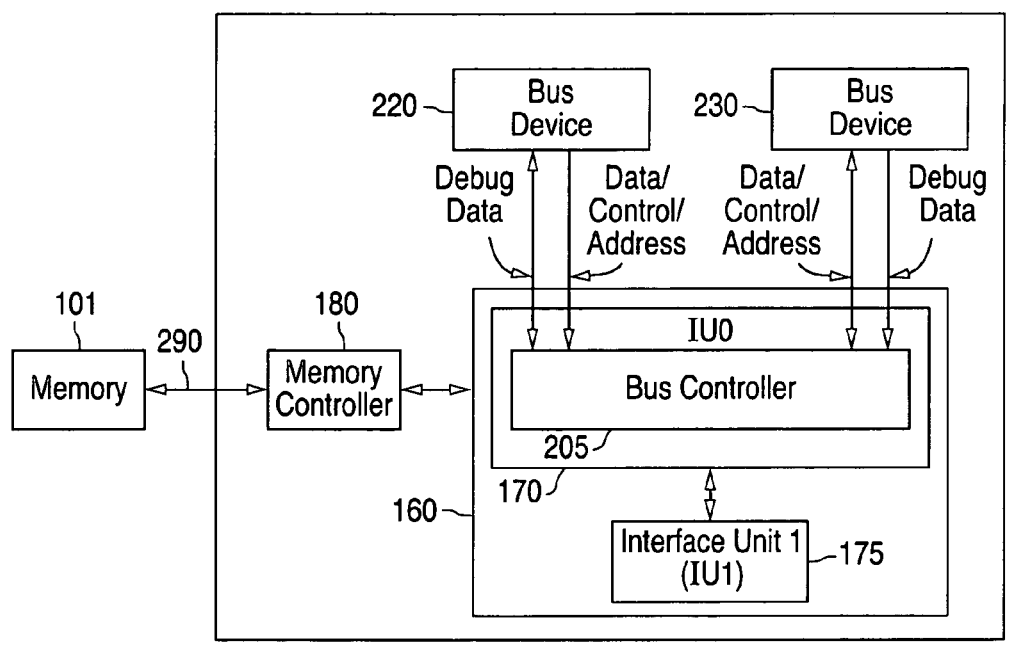
FIG. 2 illustrates selected portions of the internal bus of the processing system in FIG. 1 that capture bus transaction information according to an exemplary embodiment of the present invention.

FIG. 2 illustrates selected portions of internal bus 160 of processing system 100 that capture bus transaction information according to an exemplary embodiment of the present invention. Internal bus 160 comprises bus controller 205, which receives data, address and control signals from peripheral devices, such as bus device 220 and bus device 230, coupled to internal bus 160. During a read operation or write operation to memory 101, bus controller 205 also receives "sideband" information in the form of status flag bits (or debug data) that identify or define a bus access request to memory 101 on internal bus 160.

This sideband information may include, but is not limited to, an Instruction Fetch flag, a Data Fetch flag, source device identification data (i.e., the ID of bus device 220), Translation Look-aside Buffer (TLB) Walk flag, and the like. In prior art processing systems, this sideband information may be made available to an external testing device via dedicated external pins. However, internal bus 160 and memory controller 180 make the status flag bits (or debug data) available on address pins 290 to memory 101. According to an advantageous embodiment of the present invention, the debug data is output on address pins 290 during the NOP memory cycle after the memory control signal(s) is (are) exerted. The address pins of memory 101 are normally undefined during the NOP memory cycle after the memory control signals perform a read or write operation to memory 101.

Figure 3A:
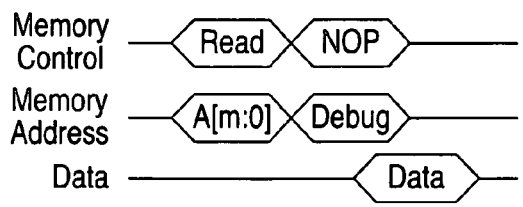
FIG. 3 is a timing diagram illustrating the operation of the exemplary memory controller according to an exemplary embodiment of the present invention.

FIG. 3A is a timing diagram illustrating the operation of memory controller 180 according to an exemplary embodiment of the present invention. Memory controller 180 sends an m-bit address to memory 101 in order to read a memory location. Memory controller 180 outputs the m address bits, A[m:0], of the memory address when the memory control signals for the read operation are exerted. After the memory control signals have been exerted, address pins 290 are no longer defined (NOP cycle) and the debug data may be output on memory address pins 290.

Figure 3B:
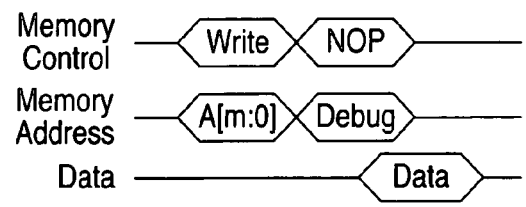

FIG. 3B is a timing diagram illustrating the operation of memory controller 180 according to an exemplary embodiment of the present invention. Memory controller 180 sends an m-bit address to memory 101 in order to write a memory location. Memory controller 180 outputs the m address bits, A[m:0], of the memory address when the memory control signals for the write operation are exerted. After the memory control signals have been exerted, address pins 290 are no longer defined (NOP cycle) and the debug data may be output on memory address pins 290.

During normal operating mode, bus controller 205 in interface unit 170 (IU0) receives a bus access request packet from a requesting device (i.e., bus device 220) coupled to internal bus 160 that is trying to read or write to memory 101. Bus controller 205 directs the request packet to memory 101 via memory controller 180. However, during test (or debug) mode, memory controller 180 outputs the request packet along with the status flag bits on address pins 290.

Figure 4:
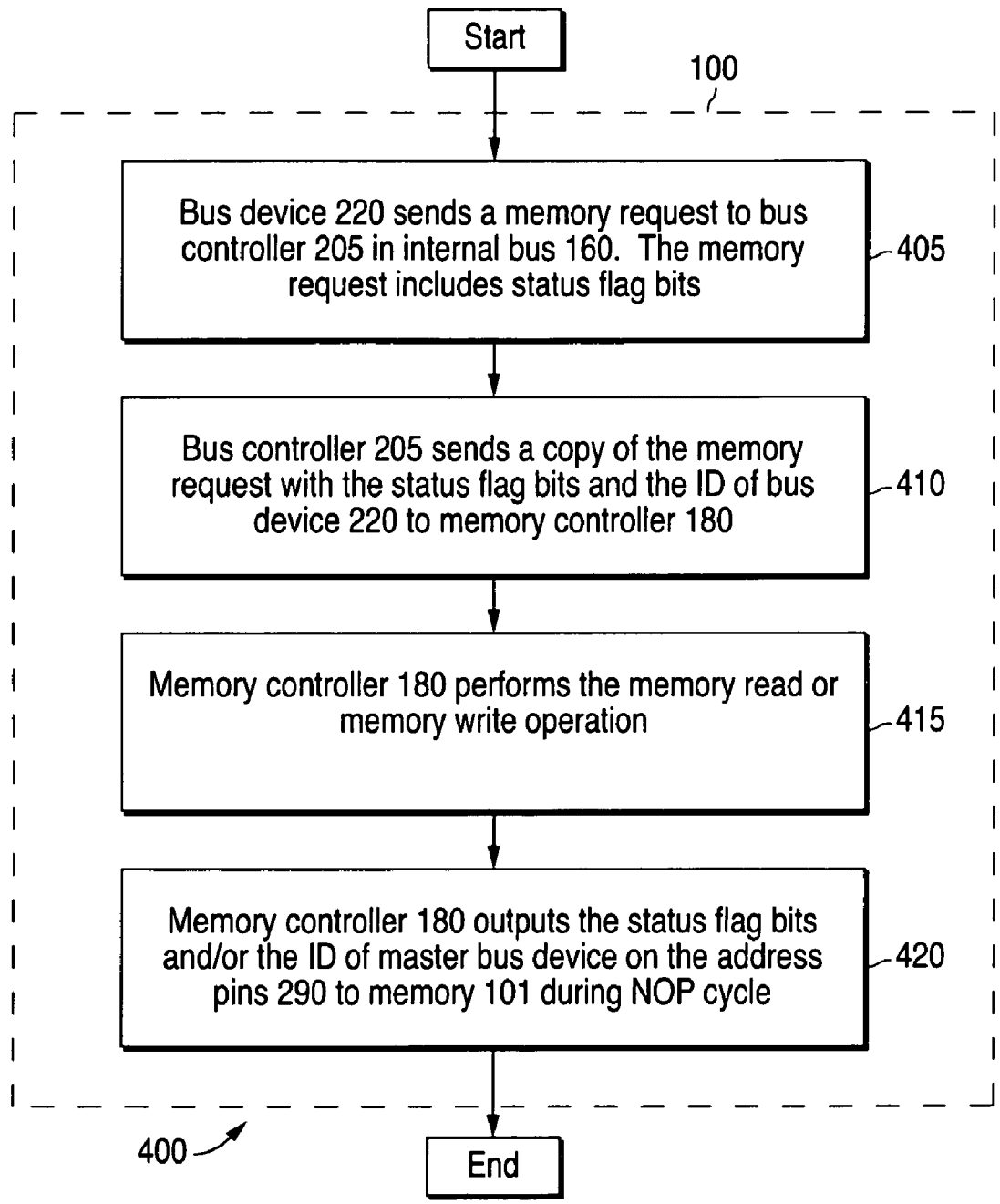
FIG. 4 is a flow diagram illustrating the operation of the internal bus according to an exemplary embodiment of the present invention.

FIG. 4 depicts flow diagram 400, which illustrates the operation of internal bus 160 according to an exemplary embodiment of the present invention. During test mode, bus device 220 initially sends a memory request packet to bus controller 205 in internal bus 160. The memory request includes status flag bits (or debug data) (process step 405). Bus controller 205 sends the memory request to memory controller 180 according to normal operation (process step 410). The memory request sent to memory controller 180 includes the status flag bits and the ID data of bus device 220. Next, memory controller 180 performs the read operation or write operation to memory in the conventional manner (process step 415). Finally, memory controller 180 outputs the status flag bits and/or the ID of bus device 220 on the address pins 290 to memory 101 after the read/write memory control signals have been exerted, at a time when address pins 290 are normally in a NOP state (process step 420).

Although the present invention has been described with an exemplary embodiment, various changes and modifications may be suggested to one skilled in the art. It is intended that the present invention encompass such changes and modifications as fall within the scope of the appended claims.

What is claimed is:

1. A processing system comprising:
a communication bus coupled to a processor core, a memory and a plurality of peripheral devices and capable of transferring bus transactions between said processor core, said memory, and said plurality of peripheral devices, wherein said communication bus comprises a bus controller capable of receiving non-address data associated with a first memory access to a first location in said memory by a first one of said peripheral devices and transferring said received non-address data to at least one memory address pin used to access said memory, and wherein said bus controller transfers said received non-address data to said at least one memory address pin during at least one no-operation (NOP) cycle on said at least one memory address pin.

2. The processing system as set forth in claim 1 wherein said bus controller transfers said received non-address data to said at least one memory address pin via a memory controller associated with said processing system.

3. The processing system as set forth in claim 1 wherein said received non-address data comprises identification data associated with said first peripheral device.

4. The processing system as set forth in claim 1 wherein said received non-address data comprises status flag bits associated with said first bus transaction.

5. The processing system as set forth in claim 4 wherein said status flag bits comprise an Instruction Fetch flag.

6. The processing system as set forth in claim 4 wherein said status flag bits comprise a Data Fetch flag.

7. The processing system as set forth in claim 4 wherein said status flag bits comprise a Translation Look-aside Buffer (TLB) Walk flag.

8. An integrated circuit comprising:
a communication bus coupled to a processor core, a memory and a plurality of peripheral devices and capable of transferring bus transactions between said processor core, said memory, and said plurality of peripheral devices, wherein said communication bus comprises a bus controller capable of receiving non-address data associated with a first memory access to a first location in said memory by a first one of said peripheral devices and transferring said received non-address data to at least one memory address pin used to access said memory, and wherein said bus controller transfers said received non-address data to said at least one memory address pin during at least one no-operation (NOP) cycle on said at least one memory address pin.

9. The integrated circuit as set forth in claim 8 wherein said bus controller transfers said received non-address data to said at least one memory address pin via a memory controller associated with said integrated circuit.

10. The integrated circuit as set forth in claim 8 wherein said received non-address data comprises identification data associated with said first peripheral device.

11. The integrated circuit as set forth in claim 8 wherein said received non-address data comprises status flag bits associated with said first bus transaction.

12. The integrated circuit as set forth in claim 11 wherein said status flag bits comprise an Instruction Fetch flag.

13. The integrated circuit as set forth in claim 11 wherein said status flag bits comprise a Data Fetch flag.

14. The integrated circuit as set forth in claim 11 wherein said status flag bits comprise a Translation Look-aside Buffer (TLB) Walk flag.

15. For use in a system-on-a-chip (SOC) device comprising a processor core, a plurality of peripheral devices, and a communication bus coupled to the processor core, a memory and the plurality of peripheral devices, a method comprising:
receiving non-address data associated with a first memory access to a first location in the memory by a first one of the peripheral devices; and
transferring the received non-address data to at least one memory address pin used to access the memory during at least one no-operation (NOP) cycle on the at least one memory address pin.

16. The method as set forth in claim 15 wherein transferring transfers the received non-address data to the at least one memory address pin via a memory controller associated with the processing system.

17. The method as set forth in claim 15 wherein transferring transfers the received non-address data to the at least one memory address pin after memory read control signals have been applied to the memory.

18. The method as set forth in claim 15 wherein transferring transfers the received non-address data to the at least one memory address pin after memory write control signals have been applied to the memory.

* * * * *